United States Patent
Stemmle et al.

(10) Patent No.: US 9,070,497 B2
(45) Date of Patent: Jun. 30, 2015

(54) ARRANGEMENT WITH AT LEAST ONE SUPERCONDUCTIVE CABLE

(71) Applicant: NEXANS, Paris (FR)

(72) Inventors: Mark Stemmle, Hannover (DE); Klaus Schippl, Hannover (DE); Stephan Lange, Wedemark (DE); Michele Di Palma, Springe (DE)

(73) Assignee: NEXANS, Paris (FR)

( * ) Notice: Subject to any disclaimer, the term of this patent is extended or adjusted under 35 U.S.C. 154(b) by 91 days.

(21) Appl. No.: 13/947,252

(22) Filed: Jul. 22, 2013

(65) Prior Publication Data

US 2014/0038827 A1 Feb. 6, 2014

(30) Foreign Application Priority Data

Aug. 3, 2012 (EP) .................................. 12305959

(51) Int. Cl.
| | | |
|---|---|---|
| *H01B 12/16* | (2006.01) | |
| *H01B 12/00* | (2006.01) | |
| *H02G 15/34* | (2006.01) | |
| *F16L 59/14* | (2006.01) | |
| *F16L 51/02* | (2006.01) | |

(52) U.S. Cl.
CPC ................ *H01B 12/16* (2013.01); *H01B 12/00* (2013.01); *H02G 15/34* (2013.01); *Y02E 40/64* (2013.01); *Y02E 40/648* (2013.01); *F16L 59/141* (2013.01); *F16L 51/025* (2013.01)

(58) Field of Classification Search
CPC ............................. H01F 6/065; G01R 33/3815
See application file for complete search history.

(56) References Cited

U.S. PATENT DOCUMENTS

| | | | |
|---|---|---|---|
| 2006/0011377 A1 | 1/2006 | Schmidt et al. | |
| 2006/0211579 A1* | 9/2006 | Yamaguchi | 505/230 |
| 2006/0272847 A1 | 12/2006 | Allais et al. | |
| 2010/0285968 A1* | 11/2010 | Gregory | 505/300 |

OTHER PUBLICATIONS

Hamabe et al., "Cooling cycle test of DC superconducting power transmission cable", Journal of Physics: Conference Series, 234 032019; Jul. 22, 2010, pp. 1-6.*

* cited by examiner

*Primary Examiner* — Colleen Dunn
(74) *Attorney, Agent, or Firm* — Sofer & Haroun, LLP

(57) ABSTRACT

An arrangement is provided with at least one superconductive cable and a cryostat surrounding the cable is disclosed. The cryostat includes at least one thermally insulated pipe which encloses the superconductive cable and a hollow space for conducting a cooling agent therethrough. The cryostat is constructed in the same manner as the superconductive cable located in the cryostat for connection to stationary parts of a transmission path for electrical energy. At each of the ends of the cryostat (KR) constructed for connection to the stationary parts of the transmission path, two spaced apart bellows are mounted in the cryostat (KR), and between the two bellows each of the two ends of the cryostat (KR) a thermally insulated and curved pipe piece is mounted belonging to the cryostat (KR).

4 Claims, 2 Drawing Sheets

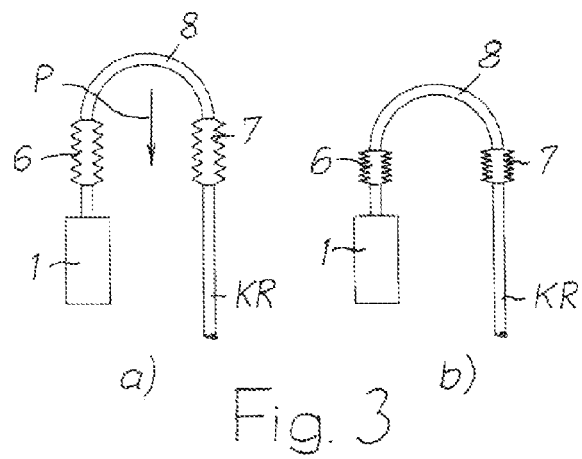
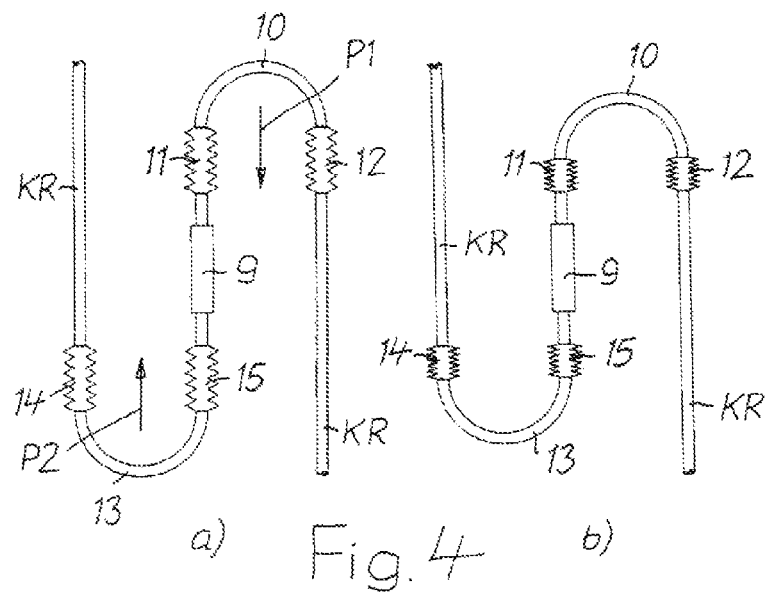

ARRANGEMENT WITH AT LEAST ONE SUPERCONDUCTIVE CABLE

RELATED APPLICATION

This application claims the benefit of priority from European Patent Application No. 12 305 959.4, filed on Aug. 3, 2012, the entirety of which is incorporated by reference.

BACKGROUND

1. Field of the Invention

The invention relates to an arrangement with at least one superconductive cable and a cryostat which surrounds the cable, wherein the cryostat has at least one thermally insulated pipe which encloses the superconductive cable and a hollow space for conducting a cooling agent there through, wherein the cryostat, in the same manner as the superconductive cable located in the cryostat, is constructed for connection to stationary parts of a transmission path for electrical energy.

2. Description of Related Art

Such an arrangement is disclosed, for example, in EP 1 617 537 Stationary parts of the transmission path may be end closures or connecting sleeves by means of which two lengths composed of cryostat and cable are connected to each other.

A superconductive cable includes electrical conductors of a material which changes over into the superconductive state at sufficiently low temperatures. The electrical direct current resistance of a correspondingly constructed conductor is zero with sufficient cooling, as long as a certain current, the critical current, is not exceeded. Suitable superconductive materials are for example, oxidic materials on the basis of rare earths, (ReBCO), in particular YBCO (yttrium-barium-copper oxide), or BSCCO (bismuth-strontium-calcium-copper oxide). Sufficiently low temperatures for placing such a material into the superconductive state are for example, between 67K and 110K. However, there are also superconductive materials, such as for example magnesium diboride, which have to be cooled down even further if they are to change into the superconductive state. Suitable cooling agents for all these materials are for example, nitrogen, helium, neon, and hydrogen or mixtures of these materials.

Accordingly, during operation of an arrangement with at least one superconductive cable, the cable is significantly cooled within the cryostat which causes it to become shorter due to thermal contraction. In order to ensure operability of the transmission path, precautions must be made through which the reduction in length of the cable can be compensated.

The Journal of Physics, Vol. 234, No. 3, 22 Jul. 2010, Pages 1 to 6, describes a to path with respect to cooling of a superconductive cable. The cable is mounted in a cryostat which, in a curved configuration with a length of 16 m, is arranged between two end points which are designated as cryostats A and B. At each of these end points a single bellows is mounted in the cryostat which extends in this area in an unchanged straight line.

US 2010/0285968 A1 discloses a method for compensating a thermally caused reduction in length of a superconductive cable as the cable cools. The construction of a corresponding arrangement provides for a central tension proof structural component. The document also discloses that an undulated jacket composed of thin metal is provided.

EP 0 807938 A1 discloses a sleeve for electrical superconductive conductors which has four radially separated pipes. The pipes have alternating straight sections with high mechanical stability and transversely undulated sections so that the sleeve, which is stiff per se, becomes bendable.

In accordance with US 2006/0211579 A1, straight sections of a superconductive cable constructed as a pipe are connected to each other by means of bellows. The purpose of this is to absorb the effects of earthquakes and for compensating for the unevenness of the ground.

In the arrangement according to EP 1 720 176 B1, a superconductive cable is mounted in a cryostat in such a way that it has the shape of a shaft or helix at room temperature. The resulting excess length of the cable as compared to the cryostat is stabilized by a cross-like network which is connected to the cable in a point by point manner.

EP 1 617 537 B1 mentioned in the beginning discloses an arrangement with a superconductive cable placed in a cryostat, wherein the cable is connected to an end closure. The electrical conductor of the end closure is equipped with a pipe shaped structural component which has radially resilient lamellae of an electrically conductive material into which the conductor of the superconductive cable protrudes in the assembled state. In the case of thermally caused length changes, the superconductive cable can slide in its longitudinal direction in the pipe shaped structural component.

OBJECTS AND SUMMARY

It is the object of the invention to simplify the construction of the above described arrangement.

In accordance with the invention, this object is met in that
at each of the ends of the cryostat constructed for connection to the stationary parts of the transmission path, two spaced apart bellows arranged at a distance from each other are mounted in the cryostat, and
a thermally insulated an curved pipe piece belonging to the cryostat is mounted between the two bellows of each of the two ends of the cryostat.

In this arrangement the superconductive cable can be laid without any special treatment.

In this arrangement the superconductive cable can be laid without any special treatment, for example, between two end closures and can be electrically conductively connected to the end closures using conventional technology. The cryostat, which is then also rigidly connected to the end closures, is at its ends connected to the end closures elastically deformable, because of the presence of the respectively two bellows, in such a way that it can easily follow the shortening of the cable caused by cooling. The bellows, which are connected through the bent pipe piece through which the cable is guided, are merely pressed together by the cable as the cable becomes shorter, and the bellows themselves become shorter as a result. The two bellows are uniformly mechanically loaded by the bent pipe piece and are uniformly pressed together. The remaining length of the cryostat is not influenced by the shortening of the cable.

The pipe piece may be flexible, or also smooth and, thus, rigid.

BRIEF DESCRIPTION OF DRAWINGS

Embodiments of the subject matter of the invention are illustrated in the drawings.

In the drawing:

FIGS. 3a and 3b show a detail of the arrangement according to FIG. 1.

FIGS. 4a and 4b show the arrangement with a different use as compared to FIG. 3.

DETAILED DESCRIPTION

Figure 1:
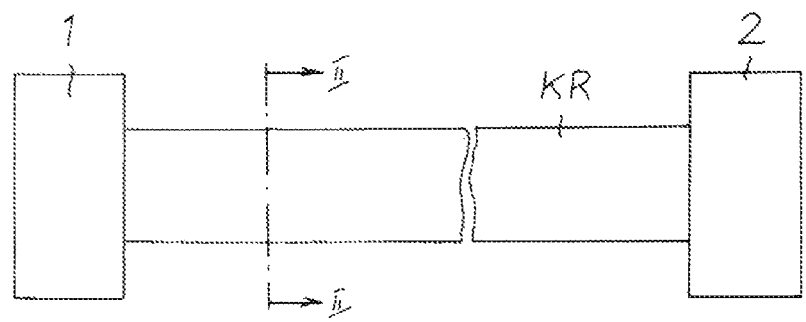
FIG. 1 is a schematic illustration of an arrangement according to the invention.
Figure 2:
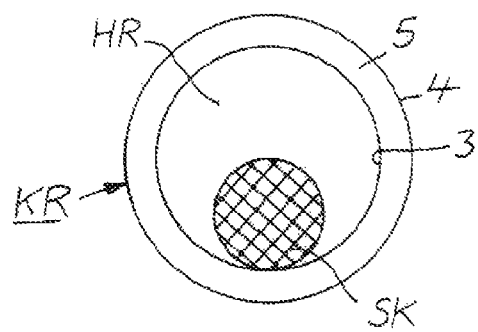
FIG. 2 is a sectional view on a larger scale of FIG. 1 taken along line II-II.

Two end closures 1 and 2 are schematically illustrated in FIG. 1 as stationary parts for a transmission path for electrical energy. Such end closures are known, so that their construction will not be discussed in detail. A cryostat KR and a superconductive cable SK, located in the cryostat KR, are fixedly connected to the two end closures 1 and 2 (FIG. 2).

The cryostat KR should have at least one thermally insulated pipe of metal or synthetic material for receiving the cable SK and for conducting a cooling agent therethrough. In the embodiment according to FIG. 2, the cryostat is composed of two pipes 3 and 4 of metal, preferably high grade steel, which are arranged coaxially and at a distance from each other, wherein a spacer member and a thermal insulation 5 are arranged, preferably a vacuum insulation. The pipes 3 and 4 may be undulated transversely of their longitudinal direction and, thus, easily bendable. The cryostat KR encloses, in addition to the cable SK, a hollow space through which a cooling agent can be conducted. The construction of the superconductive cable SK is optional. It is also possible to accommodate two or more superconductive cables in the cryostat KR.

In FIG. 3, the arrangement according to the invention is illustrated in conjunction with the end closure 1. The corresponding construction is applicable in the same manner also to the end closure 2. As is true for the cable SK surrounded by the cryostat KR, the cryostat KR is rigidly connected to the end closure 1. At the other end, which in this case is left unoccupied, the cryostat KR and the cable SK surrounded by the cryostat KR are fixedly connected to another stationary part of the transmission path for electrical energy. The cryostat KR has at its end two bellows 6 and 7 which are arranged in the cryostat KR at a distance from each other. They are connected to each other by a bent pipe piece 8 which belongs to the cryostat KR. The bellows 6 and 7 should preferably be located symmetrically relative to the pipe piece 8, as it is illustrated in FIG. 3. If, in accordance with FIG. 2, the cryostat KR is composed of two coaxial pipes, a bellows is mounted in each of the two pipes.

The pipe piece 8 is preferably of the same construction as the cryostat KR. Accordingly, it may consist of a section of only one thermally insulated pipe or, of a section of a double pipe which is composed of two pipes arranged concentrically and at a distance from each other between which a thermal insulation is mounted. The pipe, or the pipes of the pipe piece 8, can be smooth and thus rigid, but also undulated and thus flexible. The pipe piece 8 is advantageously bent around 180°, however at least about 180°, so that a symmetrical arrangement of the bellows 6 and 7 connected to the pipe piece 8 is obtained, as illustrated in preferred embodiment of FIG. 3.

FIG. 3a shows the arrangement according to the invention at room temperature. The bellows 6 and 7 then preferably have their full length. When operation of the arrangement is started, a cooling agent is conducted through the cryostat KR, so that the cable SK is cooled and becomes shorter as a result. The cable SK then rests against the wall of the pipe piece 8 and pulls the pipe piece in the direction of arrow P. This presses the bellows 6 and 7 together. In the preferred symmetrical embodiment according to FIG. 3, the bellows are compressed uniformly. The respectively shortened end position of the bellows 6 and 7 is illustrated in FIG. 3b.

FIG. 4 shows, as a stationary part of the transmission path for electrical energy, a connecting sleeve 9 to which the cryostat KR and the cable SK enclosed by the cryostat are fixedly connected. In the illustrated embodiment, bellows are mounted in the cryostat KR on both sides of the connecting sleeve 9. They are the bellows 11 and 12 connected to each other through a pipe piece 10 on the one hand, and on the other hand they are the bellows 14 and 15 which are connected to each other through a pipe piece 13. The ends of the cryostat KR which have been left open are also, in this case, rigidly connected to other stationary parts of the transmission path, for example, with end closures.

In FIG. 4a the arrangement is illustrated analogously to FIG. 3a at room temperature. When the cable SK cools, the same procedure occurs as described with respect to FIG. 3. The pipe piece 10 is pulled in the direction of arrow P1 so that the bellows 11 and 12 are shortened, while the pipe piece 13 is pulled in the direction of arrow P2 so that the bellows 14 and 15 are shortened. The shortened end positions of the bellows 11 and 12, as well as 14 and 15, can be seen in FIG. 4b.

FIGS. 3 and 4 illustrate the different bellows in a plane next to each other. If necessary, they can also be arranged one above the other. When cooling of the cable SK is stopped or interrupted, the cable expands again. The various bellows then once again become longer on their own strength.

The invention claimed is:

1. Arrangement comprising:
    at least one superconductive cable; and
    a cryostat surrounding the cable,
        wherein the cryostat has at least one thermally insulated pipe which encloses the superconductive cable and a hollow space for conducting a cooling agent therethrough,
        wherein the cryostat, in the same manner as the superconductive cable located in the cryostat, is constructed for connection to stationary parts of a transmission path for electrical energy,
        wherein at each of the ends of the cryostat constructed for connection to the stationary parts of the transmission path, two bellows are mounted at a distance from each other in the cryostat, and
        wherein between the two bellows of each of the two ends of the cryostat, a thermally insulated and curved pipe piece belonging to the cryostat is mounted.

2. Arrangement according to claim 1, wherein the pipe piece is bent between the two bellows by 180° or approximately 180°.

3. Arrangement according to claim 1, wherein the pipe piece is constructed as a section of at least one smooth pipe.

4. Arrangement according to claim 1, wherein the pipe piece is constructed as at least one flexible pipe.

* * * * *